United States Patent
Patsis et al.

(10) Patent No.: US 9,448,000 B2
(45) Date of Patent: Sep. 20, 2016

(54) THERMALLY INSULATED RECEPTACLES

(71) Applicant: Speaqua Corp., Deer Park, NY (US)

(72) Inventors: Steven G. Patsis, Deer Park, NY (US); Steven Patsis, Deer Park, NY (US)

(73) Assignee: SPEAQUA CORP., Deer Park, NY (US)

( * ) Notice: Subject to any disclaimer, the term of this patent is extended or adjusted under 35 U.S.C. 154(b) by 2 days.

(21) Appl. No.: 14/556,838

(22) Filed: Dec. 1, 2014

(65) Prior Publication Data

US 2016/0153690 A1 Jun. 2, 2016

(51) Int. Cl.
*F25D 3/08* (2006.01)
*B65D 25/42* (2006.01)
*B62B 1/10* (2006.01)
*B67D 1/08* (2006.01)
*H04R 1/02* (2006.01)

(52) U.S. Cl.
CPC . *F25D 3/08* (2013.01); *B62B 1/10* (2013.01); *B65D 25/42* (2013.01); *B67D 1/0801* (2013.01); *H04R 1/025* (2013.01); *H04R 1/028* (2013.01); *B67D 2001/0812* (2013.01); *H04R 2420/07* (2013.01)

(58) Field of Classification Search
CPC ......... F25D 3/08; H04R 1/028; H04R 1/025; H04R 2420/07; B62B 1/10; B67D 1/0801; B67D 2001/0812; B65D 25/42
USPC ....... 222/608, 545, 563, 566, 567, 527, 529, 222/173, 400.7; 62/371; 455/351, 344; 312/237; 220/524, 592.03; 206/542; 381/334, 332, 333, 395, 386–388
See application file for complete search history.

(56) References Cited

U.S. PATENT DOCUMENTS

| | | | | |
|---|---|---|---|---|
| 1,887,185 | A * | 11/1932 | Edwin | H04R 1/02 181/150 |
| 4,571,740 | A * | 2/1986 | Kirby | A45C 11/20 206/216 |
| 4,700,395 | A | 10/1987 | Long | |
| 4,706,847 | A * | 11/1987 | Sankey | B67D 1/04 137/329.4 |
| 4,817,191 | A | 3/1989 | Adams | |
| 4,939,912 | A | 7/1990 | Leonovich, Jr. | |
| 5,235,822 | A | 8/1993 | Leonovich, Jr. | |
| 5,447,041 | A | 9/1995 | Piechota | |
| 5,570,764 | A * | 11/1996 | Levin | A45C 5/14 16/18 R |
| 5,638,991 | A * | 6/1997 | Todden | B67D 1/0006 222/113 |
| 5,781,853 | A | 7/1998 | Johnson | |
| 5,979,175 | A | 11/1999 | Ellison | |
| 6,216,488 | B1 | 4/2001 | Rucker | |
| 6,305,185 | B1 * | 10/2001 | Sloan | A45C 5/14 62/235.1 |
| 6,980,788 | B2 | 12/2005 | Peeples | |
| 7,143,601 | B1 | 12/2006 | Jimenez | |

(Continued)

OTHER PUBLICATIONS

Grepper, Coolest Cooler: 21st Century Cooler that's Actually Cooler, www.kickstarter.com/projects/ryangrepper/coolest-cooler-21st-century-cooler-thats . . . , successfully funded on Aug 29, 2014, printed Mar. 2, 2015.

*Primary Examiner* — Donnell Long
(74) *Attorney, Agent, or Firm* — Carter, DeLuca, Farrell & Schmidt, LLP

(57) ABSTRACT

A thermally insulated receptacle includes a body, a cover, and a loudspeaker. The body defines a cavity. The cover is operatively coupled to the body and movable relative to the body to selectively cover the cavity. The loudspeaker is pivotably coupled to the body. The receptacle may include a spigot that is configured to be fluidly coupled to a bottle.

11 Claims, 8 Drawing Sheets

(56) References Cited

U.S. PATENT DOCUMENTS

| | | | |
|---|---|---|---|
| 7,188,491 B2 * | 3/2007 | Donald, II | B62B 3/00 348/E5.128 |
| 7,722,204 B1 | 5/2010 | Sandberg | |
| 7,806,271 B1 * | 10/2010 | Kraska | A45C 11/20 206/216 |
| 7,937,964 B2 | 5/2011 | Temple | |
| 8,369,561 B2 * | 2/2013 | Bhutani | H04R 5/02 381/332 |
| 2003/0139169 A1 | 7/2003 | Arreazola, Jr. | |
| 2007/0279857 A1 * | 12/2007 | Sun | G06F 1/162 361/679.55 |
| 2008/0025544 A1 | 1/2008 | Maldonado | |
| 2008/0031483 A1 | 2/2008 | Hill | |
| 2008/0110931 A1 * | 5/2008 | Prabucki | B67D 3/0029 222/146.1 |
| 2009/0049859 A1 | 2/2009 | Moon | |
| 2009/0078724 A1 * | 3/2009 | Lamb | B60P 3/0257 222/608 |
| 2010/0126196 A1 | 5/2010 | McCance | |
| 2010/0263398 A1 | 10/2010 | Webb | |
| 2011/0005260 A1 | 1/2011 | Ferguson et al. | |
| 2012/0294550 A1 | 11/2012 | Hassman et al. | |
| 2014/0013789 A1 | 1/2014 | Conrad et al. | |
| 2014/0023220 A1 * | 1/2014 | Ku | H04R 1/403 381/333 |
| 2015/0010189 A1 | 1/2015 | Besay | |
| 2015/0114024 A1 * | 4/2015 | Grepper | F25D 23/00 62/320 |
| 2015/0159938 A1 * | 6/2015 | Weckerly | F25D 23/12 381/334 |

* cited by examiner

THERMALLY INSULATED RECEPTACLES

BACKGROUND

Thermally-insulated receptacles maintain beverages, food, and other items at a cool temperature without using a source of power. These receptacles are fabricated from thermally insulative materials that resist a transfer of heat therethrough. These receptacles are sometimes referred to as coolers or ice boxes and may be portable, stand-alone containers, or may be integrally formed within vehicles and the like.

Thermally-insulated receptacles are often used in situations in which access to electricity is limited, e.g., during traveling, times of unexpected power outages, or being at a remote location. During these situations, it may be desirable to have a thermally insulated receptacle capable of providing much more than merely serving the unitary function of maintaining its contents at a cool temperature.

Accordingly, there is a need for improved thermally insulated receptacles.

SUMMARY

In one aspect of the present disclosure, a thermally insulated receptacle is provided. The thermally insulated receptacle includes a body, a cover, and a loudspeaker. The body defines a cavity. The cover is operatively coupled to the body and movable relative to the body to selectively cover the cavity. The loudspeaker is pivotably coupled to the body.

In some embodiments, the loudspeaker may have a first end pivotably coupled to the body and a second end. The loudspeaker may be pivotable between a first position and a second position. In the first position, the first and second ends of the loudspeaker are in abutment with the body. In the second position, the second end of the loudspeaker is spaced from the body.

It is contemplated that the body may include a first sidewall and a second sidewall in opposed relation to the first sidewall. The first and second sidewalls may each have a loudspeaker pivotably coupled thereto. The loudspeakers may be pivotable to a fully extended position, in which the loudspeakers are perpendicular to the respective first and second sidewalls of the body.

In some aspects of the present disclosure, the body may include a sidewall defining a depression in a surface thereof. The loudspeaker may be disposable in the depression.

In some embodiments, the body may include a sidewall defining a void. The sidewall may include a slide disposed within the void. A loudspeaker may be pivotably coupled to the slide. The slide may be movable within the void between a first position, in which the loudspeaker is disposed within the void of the sidewall, and a second position, in which the loudspeaker projects from the sidewall.

It is envisioned that the thermally insulated receptacle may include an elongate wheel rotatably connected to the body. The elongate wheel may extend from a first sidewall of the body to a second sidewall of the body.

It is contemplated that the body may be Bluetooth enabled.

In some embodiments, the thermally insulated receptacle may include a spigot attached to the body. The spigot may have a first end disposed outside of the cavity and a second end disposed within the cavity. The second end of the spigot is configured to be fluidly coupled to a bottle. The second end of the spigot may include a tube and a cannulated plug attached to the tube. The cannulated plug may be configured to frictionally engage an open end of a bottle.

In some embodiments, the thermally insulated receptacle may further include a coupling member disposed within the cavity. The coupling member is configured to hold and orient a bottle such that an open end of the bottle is disposed below a closed end of the bottle.

In another aspect of the present disclosure, a thermally insulated receptacle is provided that includes a body, a cover, and an elongate wheel. The body defines a cavity. The cover is operatively coupled to the body and movable relative to the body to selectively cover the cavity. The elongate wheel is rotatably connected to the body.

In yet another aspect of the present disclosure, a thermally insulated receptacle is provided that includes a body, a cover, a spigot, and a coupling member. The body defines a cavity. The cover is operatively coupled to the body and movable relative to the body to selectively cover the cavity. The spigot is attached to the body and has a first end disposed outside of the cavity and a second end disposed within the cavity. The second end of the spigot is configured to be fluidly coupled to an open end of a bottle. The coupling member is disposed within the cavity and is configured to hold and orient a bottle such that an open end of the bottle is disposed below a closed end of the bottle.

In some embodiments, the thermally insulative receptacle may include at least one adapter used to fluidly couple the second end of the spigot to a plurality of different type of bottles.

Further details, advantages, and aspects of exemplary embodiments of the present disclosure are described in more detail below with reference to the appended figures.

As used herein, the terms parallel and perpendicular are understood to include relative configurations that are substantially parallel and substantially perpendicular up to about + or −10 degrees from true parallel and true perpendicular.

BRIEF DESCRIPTION OF THE DRAWINGS

Embodiments of the present disclosure are described herein with reference to the accompanying drawings, wherein.

DETAILED DESCRIPTION

Figure 1:
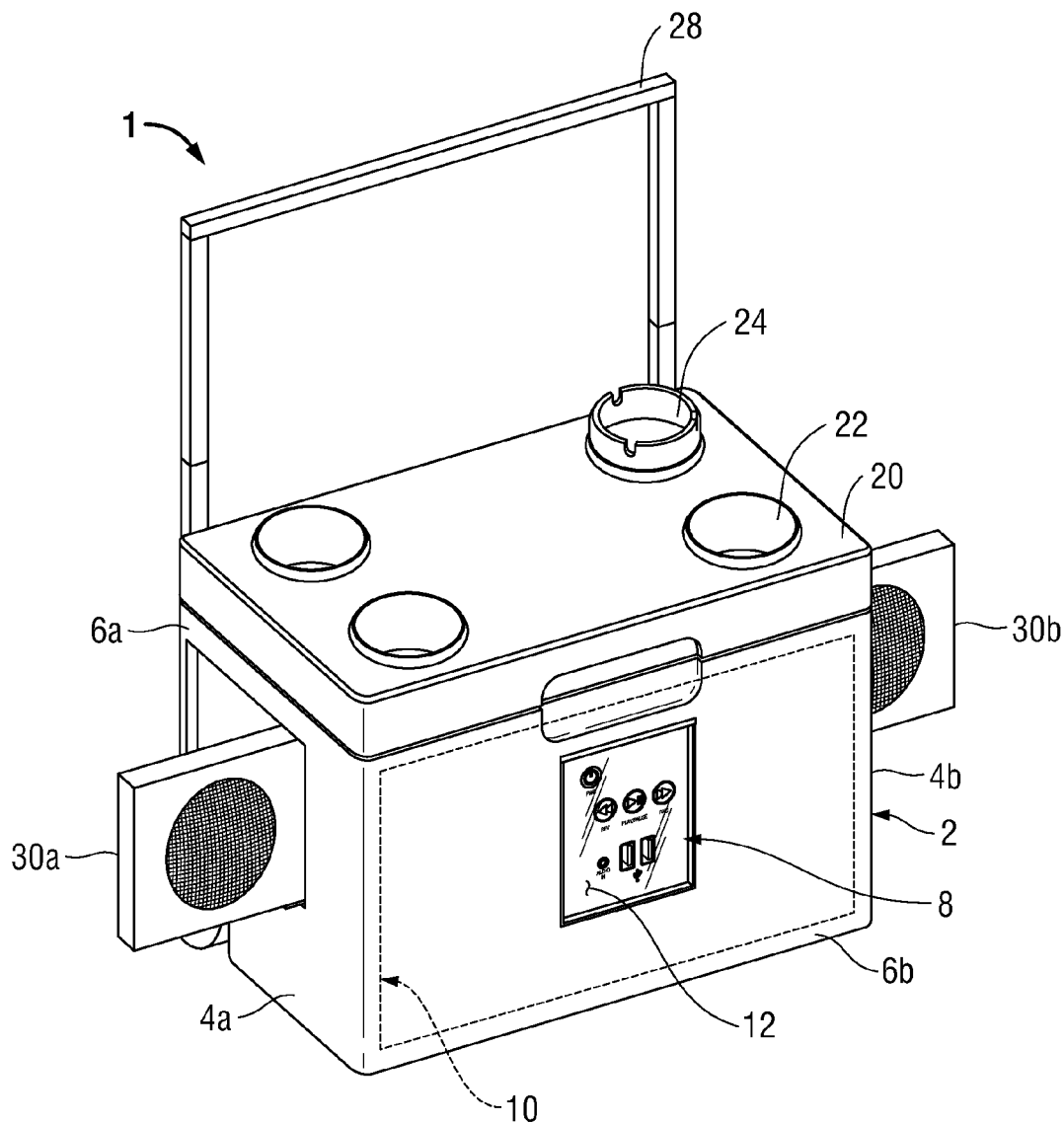
FIG. 1 is a perspective view of a thermally insulated receptacle illustrating loudspeakers and handle thereof in open positions.

Embodiments of the presently disclosed thermally insulated receptacles are described in detail with reference to the drawings, in which like reference numerals designate identical or corresponding elements in each of the several views.

Figure 2:
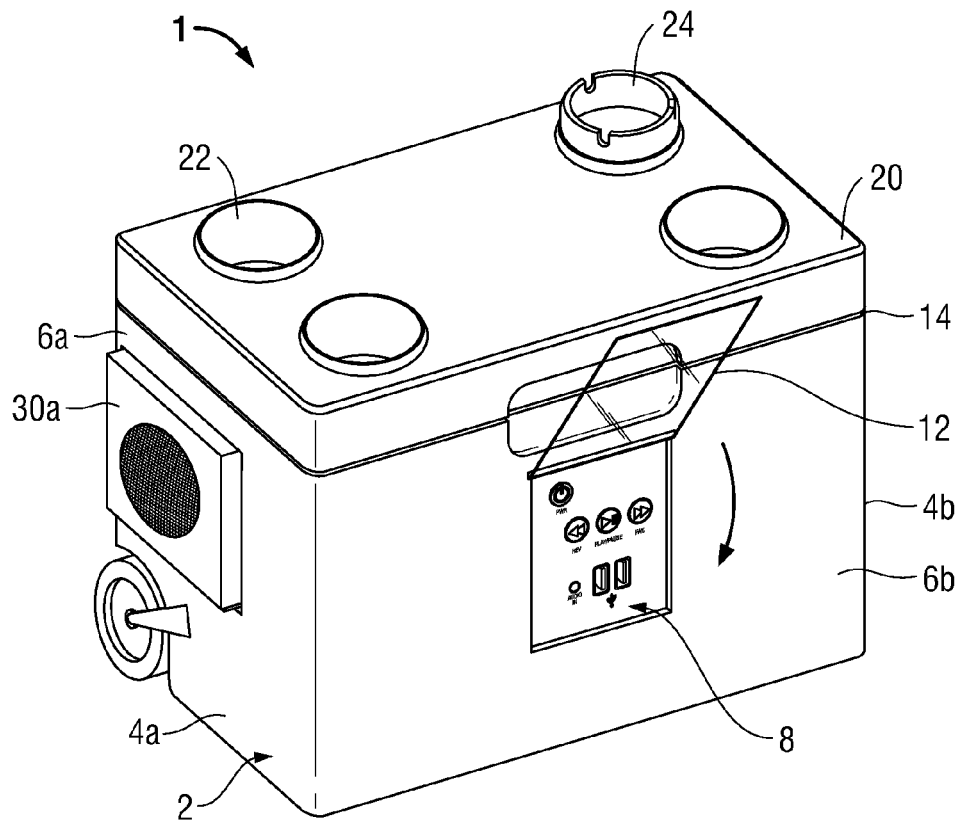
FIG. 2 is a perspective view of the thermally insulated receptacle of FIG. 1 illustrating the loudspeakers and handle in a closed position, and a cover for a user interface in an open position.
Figure 3:
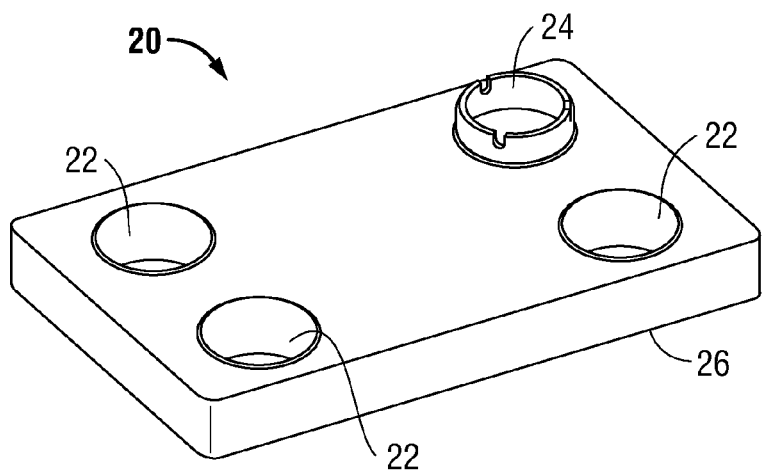
FIG. 3 is a perspective view of a cover or lid of the thermally insulated receptacle of FIG. 1.

Referring initially to FIGS. 1-3, illustrated is a thermally insulated receptacle (i.e., a cooler) generally designated by reference numeral 1. Receptacle 1 generally includes a body 2, a cover or lid 20, a pair of loudspeakers 30a, 30b, a handle 28, and an elongate wheel or wheels 32a, 32b. Body 2 has a generally rectangular configuration defined by a pair of opposing short side walls 4a, 4b and a pair of opposing long sidewalls 6a, 6b. In some embodiments, body 2 may have various shapes and configurations, such as, for example, squared, oval, triangular, oblong, tapered, etc. Sidewalls 4a, 4b, 6a, 6b and cover 20 are fabricated from thermally insulative materials, for example, sidewalls 4a, 4b, 6a, 6b and cover 20 may each consist of an outer plastic shell having a rigid foam or any suitable insulative material disposed within.

Body 2 is Bluetooth enabled such that a wireless connection can be established between receptacle 1 and an electronic device, for example, a portable media player or a mobile device. Body 2 includes a rechargeable battery (not shown) electrically connected to loudspeakers 30a, 30b to provide power to loudspeakers 30a, 30b. Body 2 also includes a user interface 8 disposed on an outer surface of long sidewall 6c. User interface 8 has a plurality of buttons, e.g., a power button, a track-skip forward button and a track-skip backward button, a pause/play button, and USB ports. User interface 8 is electrically connected to the rechargeable battery (not shown) of receptacle 1. Power may be drawn from the battery through the USB ports to charge an electronic appliance, portable media player, or a mobile device. A transparent cover 12 is pivotably coupled to sidewall 6b to selectively cover user interface 8.

Body 2 defines a cavity 10 configured for disposal of items to be kept cool (e.g., food and beverages) or items to be transported (e.g., clothing). Cover 20 is operatively coupled to long sidewall 6a of body 2 and movable relative to body 2 to selectively cover cavity 10. In particular, an outer periphery 26 of cover 20 has a female mating part, such as, for example, a cavity (not shown), and an outer periphery 14 of body 2 may have a male mating part, such as, for example, a projection (not shown), configured for detachable, mating engagement with the female mating part of cover 20. In some embodiments, cover 20 may be coupled to body 2 via a hinge joint such that cover 20 is pivotable relative to body 2. Cover 20 of receptacle 1 also includes cup holders 22 and an ashtray 24.

Figure 4A:
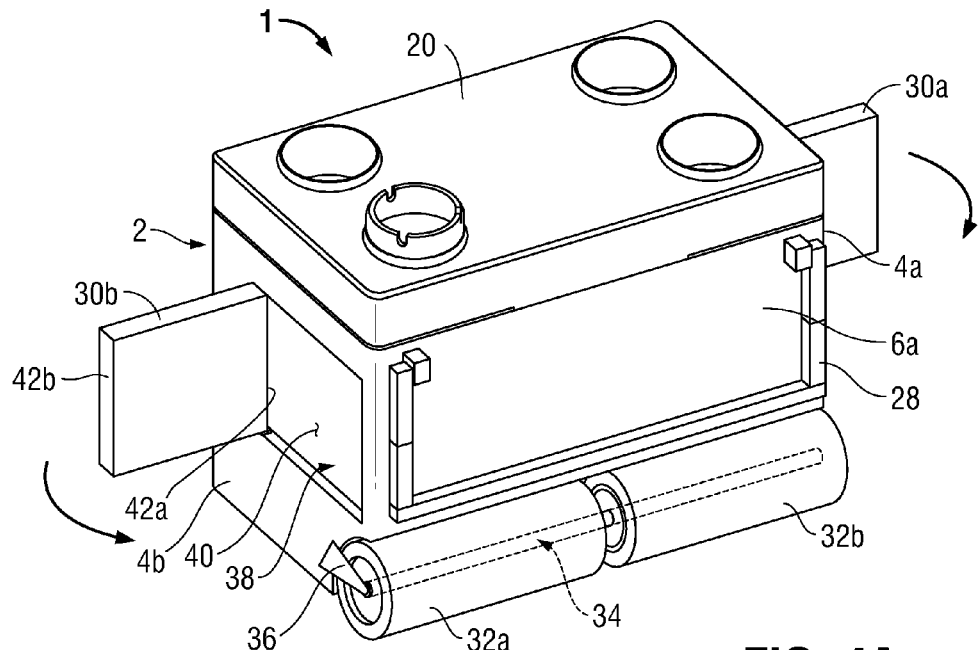
FIG. 4A is a rear, perspective view of the thermally insulated receptacle of FIG. 1 illustrating the loudspeakers in an open position.
Figure 4B:
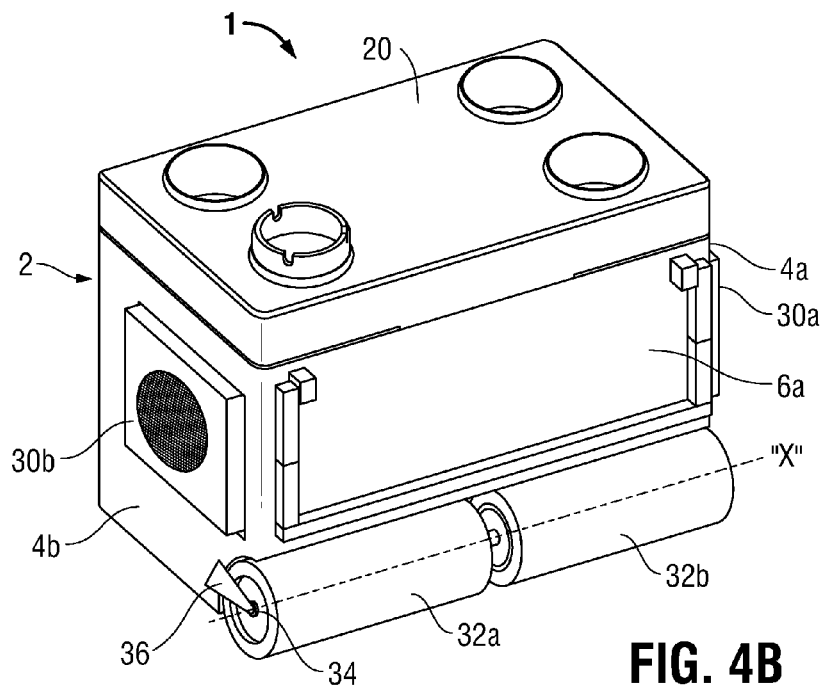
FIG. 4B is a rear, perspective view of the thermally insulated receptacle of FIG. 1 illustrating the loudspeakers in a closed position.

With reference to FIGS. 4A and 4B, receptacle 1 includes a handle 28 and a pair of elongate wheels 32a, 32b. Handle 28 and elongate wheels 32a, 32b are attached to long sidewall 6a of receptacle 1. Handle 28 is rotatable relative to sidewall 6a and is telescopic enabling handle 28 to be increased in length. Elongate wheels 32a, 32b extend along a longitudinal axis "X" and in spaced relation to one another. Each elongate wheel 32a, 32b has a length substantially equal to one-half a length of long sidewall 6a such that elongate wheels 32a, 32b together extend from sidewall 4a to sidewall 4b of body 2. It has been found that elongate wheels 32a, 32b having the aforementioned length are more proficient at rolling along soft surfaces (e.g., sand) when compared to shorter wheels in the prior art. An axle 34 is rotatably disposed within elongate wheels 32a, 32b. Ends of axle 34 are fixed to respective hinges 36 that couple elongate wheels 32a, 32b to body 2. As such, as a user applies a force on body 2 via handle 28, wheels 32a, 32b rotate about axle 34 to move receptacle 1 along a surface.

With continued reference to FIGS. 4A and 4B, receptacle 1 includes loudspeakers 30a, 30b, which are pivotably connected to body 2. Short sidewalls 4a, 4b each define a depression 38 in an outer surface 40 thereof. Depressions 38 are shaped to accommodate loudspeakers 30a, 30b therein. For example, loudspeakers 30a, 30b may have a generally squared configuration and respective depressions 38 may have a corresponding generally squared configuration.

Loudspeakers 30a, 30b each have a first end 42a and a second end 42b. First end 42a of loudspeakers 30a, 30b are pivotably connected to respective sidewalls 4a, 4b of body 2, via a pivot joint or any suitable hinge (not shown), such that loudspeakers 30a, 30b are pivotable relative to their respective sidewalls 4a, 4b between a first position and a second position. In the first position, first and second ends 42a, 42b of loudspeakers 30a, 30b are both in abutment with respective sidewalls 4a, 4b of body 2 and are both at least partially disposed within respective depressions 38, as shown in FIG. 4B. It is contemplated that in the first position, loudspeakers 30a, 30b may be flush with respective sidewalls 4a, 4b so as to not project laterally from sidewalls 4a, 4b. The overall dimensions of receptacle 1 may be kept to a minimum by moving loudspeakers 30a, 30b to the first position.

To alter or improve the sound dynamics of loudspeakers 30a, 30b, loudspeakers 30a, 30b may be pivoted outwardly from body 2 toward the second position. In the second position, second end 42b of each loudspeaker 30a, 30b is spaced from respective sidewalls 4a, 4b of body 2 and is outside of depression 38. In the second position, loudspeakers 30a, 30b are fully extended such that loudspeakers 30a, 30b are perpendicular to their respective sidewalls 4a, 4b.

Figure 5C:
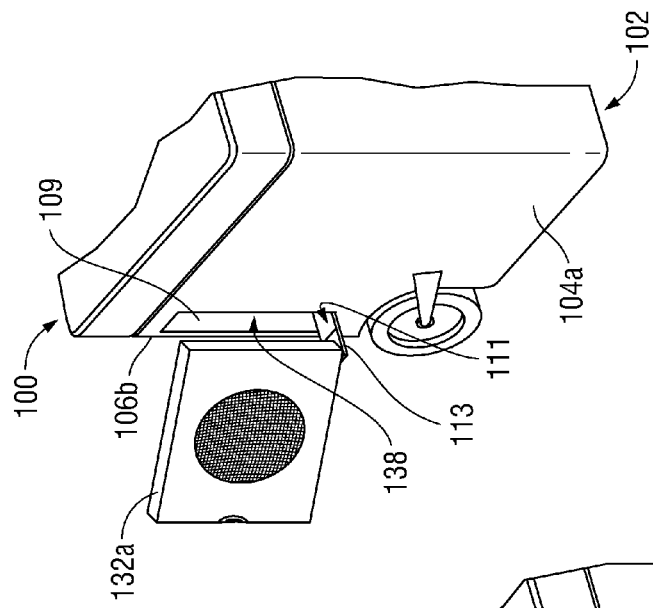
FIGS. 5A-5C are partial side views of a thermally insulated receptacle illustrating a loudspeaker in an inserted position within the thermally insulated receptacle, projecting from the thermally insulated receptacle, and pivoted relative to the thermally insulated receptacle, respectively.
Figure 5B:
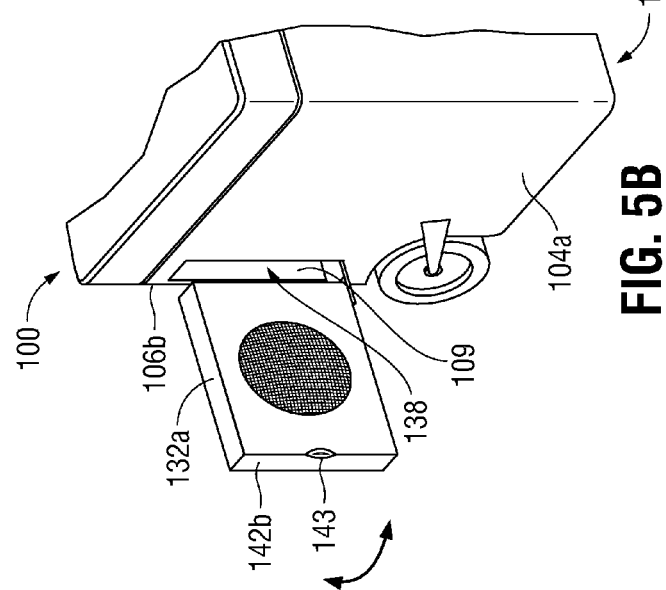
Figure 5A:
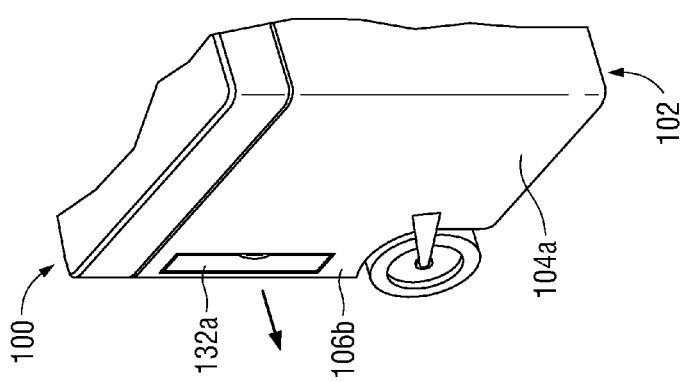

With reference to FIGS. 5A-5C, an alternate embodiment of a thermally insulated receptacle is illustrated and is designated generally by reference numeral 100. Thermally insulated receptacle 100 is similar to receptacle 1 described above, and therefore will only be described with respect to its difference(s). Thermally insulated receptacle 100 differs from thermally insulated receptacle 1 in the manner in which loudspeakers 130a, 130b pivotably connect to a body 102 of receptacle 100. In particular, a long sidewall 106b of body 102 has an interior surface 109 that defines a void 138. Void 138 is shaped and dimensioned for slidable disposal of loudspeaker 130a therein, which is similar to loudspeakers 30a, 30b described above. A slide 111 is disposed within void 138 and is slidably attached to interior surface 109. Loudspeaker 130a is pivotably coupled to an end 113 of slide 111.

Slide 111 is movable relative to void 138 between a first position and a second position. In the first position, end 113 of slide 111 is disposed within void 138 of sidewall 106b and loudspeaker 130a is fully concealed within void 138 of sidewall 106b, as shown in FIG. 5A. To alter or improve the sound dynamics of loudspeaker 130a, end 113 of slide 111 and loudspeaker 130a are translated/moved/slid along an axis of sidewall 106b to project loudspeaker 130a from a short sidewall 104a, as shown in FIG. 5B. An end 142b of loudspeaker 130a may have an indentation 143 configured to be gripped by fingers to facilitate pulling loudspeaker 130a from within void 138. Upon loudspeaker 130a being positioned outside of void 138, loudspeaker 130a may be pivoted relative to end 113 of slide 111 to further alter or improve the sound dynamics of loudspeaker 130a, as shown in FIG. 5C.

Figure 6A:
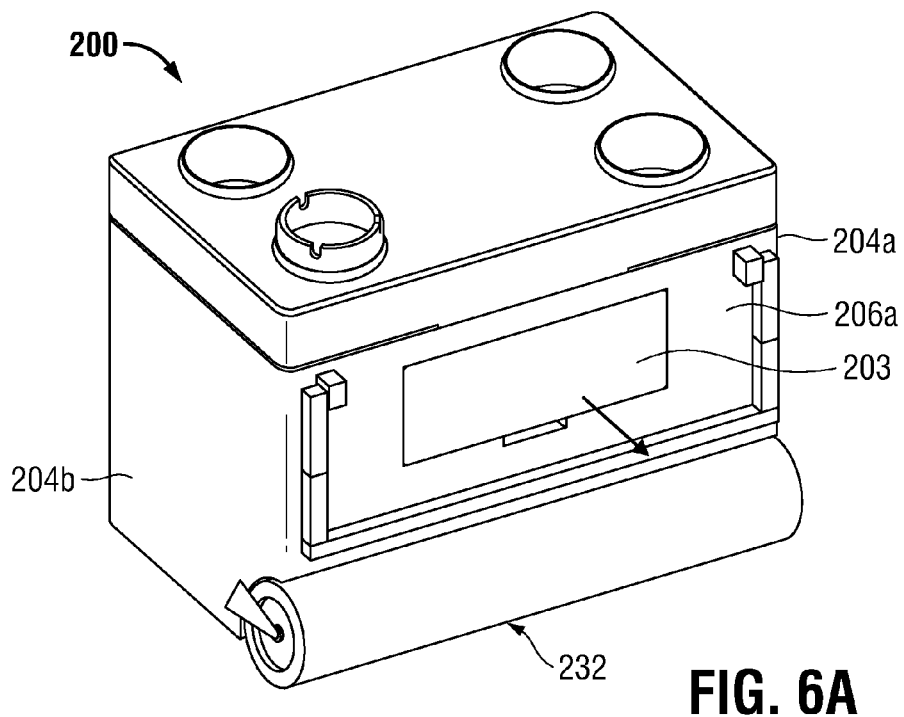
FIG. 6A is a perspective view of another embodiment of a thermally insulated receptacle illustrating a drawer in a closed position.
Figure 6B:
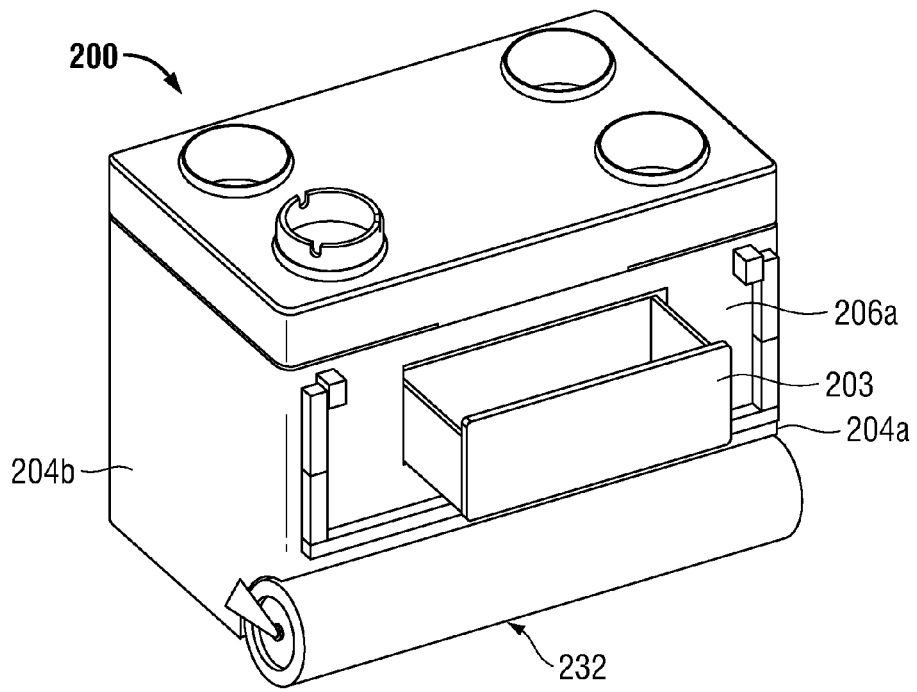
FIG. 6B is a perspective view of the thermally insulated receptacle of FIG. 6A illustrating the drawer in an open position.

With reference to FIGS. 6A and 6B, another embodiment of a thermally insulated receptacle is illustrated and is generally designated by reference numeral 200. Thermally insulated receptacle 200 is similar to receptacle 1 described above, and therefore will only be described with respect to its difference(s). Receptacle 200 is similar to receptacle 1 except that receptacle 200 includes the additional feature of a drawer 203. Drawer 203 is configured to store a plurality of items therein, such as, for example, those items described above. As such, to retrieve items being stored in receptacle 200, drawer 203 can be slid open, as shown in FIG. 6B. Further, receptacle 200 has one, monolithically formed elongate wheel 232 instead of two separate elongate wheels. Elongate wheel 232 has a length substantially equal to a length of a sidewall 206a such that elongate wheel 232 spans from a short sidewall 204a to an opposing short sidewall 204b.

Figure 7:
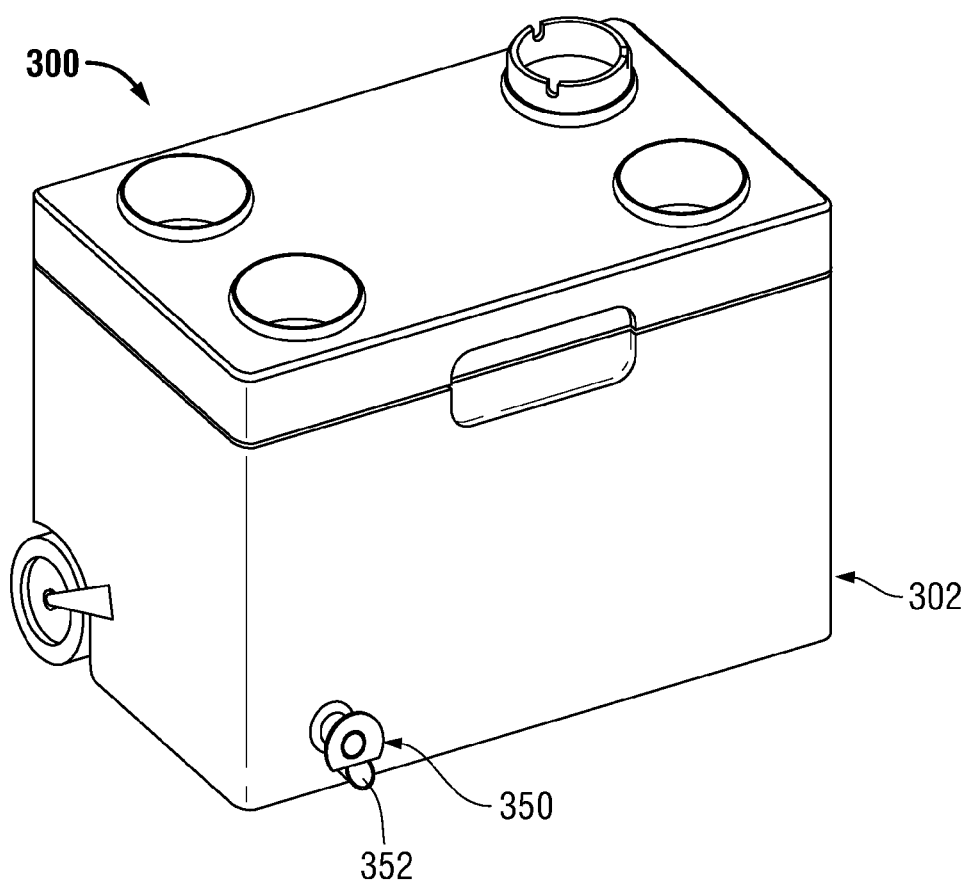
FIG. 7 is a perspective view of another embodiment of a thermally insulated receptacle having a spigot.
Figure 8A:
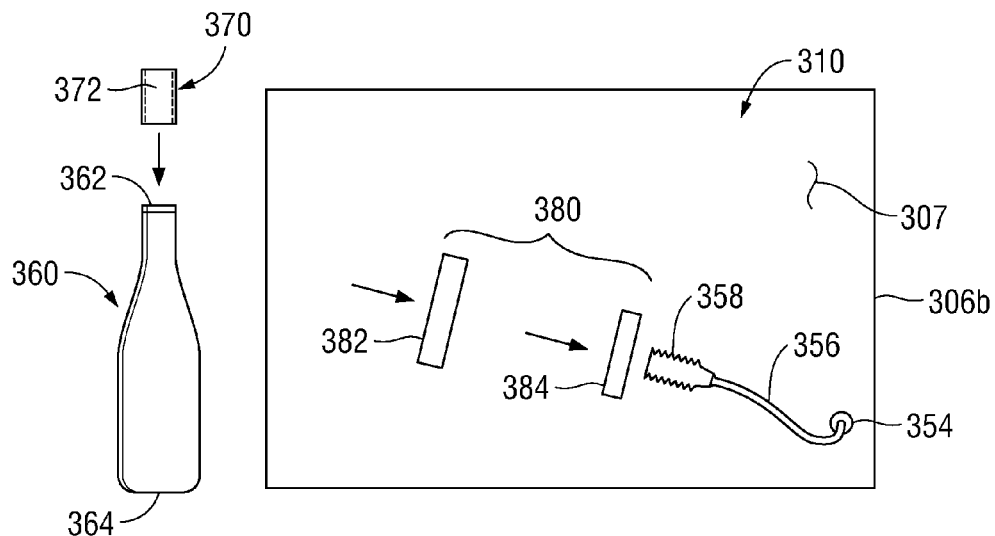
FIG. 8A is a planar view of an interior surface of a sidewall of the thermally insulated receptacle of FIG. 7.
Figure 8B:
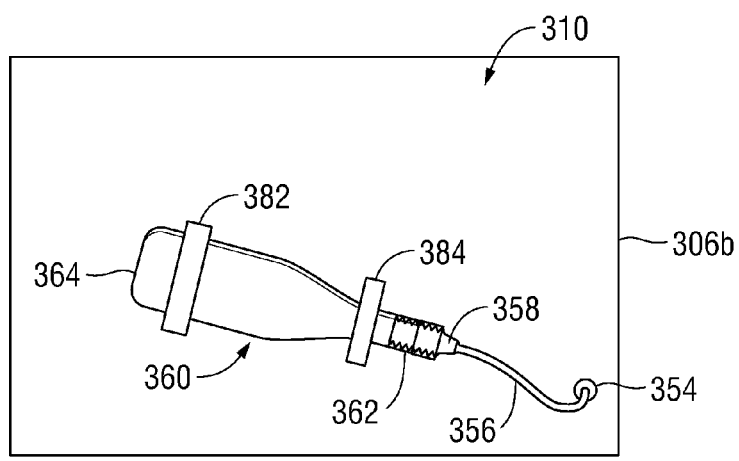
FIG. 8B is a planar view of the interior surface of the sidewall of FIG. 8A illustrating a bottle fluidly coupled to the spigot.

With reference to FIGS. 7, 8A, and 8B, yet another embodiment of a thermally insulated receptacle is illustrated and is generally designated by reference numeral 300. Thermally insulated receptacle 300 is similar to receptacle 1 described above, and therefore will only be described with respect to its difference(s). Receptacle 300 is similar to receptacle 1 except that receptacle 300 includes the additional feature of a spigot 350 that is used for dispensing a liquid from a bottle and/or releasing fluid (i.e., melted ice) accumulated at a bottom of receptacle 300. Spigot 350 is attached to a body 302 of receptacle 300 and has a first end 352 disposed outside of a cavity 310 of body 302 and a second end 354 disposed within cavity 310. Second end 354 is configured to be fluidly coupled to a bottle, such as, for example, bottle 360 illustrated in FIGS. 8A and 8B. It is contemplated that bottle 360 may be a component of receptacle 300 such that liquids may be transferred to bottle 360 from an outside source of liquid prior to use of spigot 350.

As used herein, the term bottle includes, but is not limited to, wine bottles, liquor bottles, beer bottles, kegs, soda bottles, water bottles, jugs, flasks, spout bags, or any type of bottle or container that holds liquid and has an opening for liberating its liquid contents.

Second end 354 of spigot 350 includes a tube 356 and a cannulated plug 358 attached to an end of tube 356. Cannulated plug 358 is fabricated from a resiliently pliable material, such as, for example, rubber or cork, so that cannulated plug 358 may be inserted within an open end 362 of bottle 360 to frictionally engage open end 362 of bottle 360 while also creating a fluid-tight seal with open end 362 of bottle 360. Cannulated plug 358 has a ribbed outer surface to facilitate insertion and retention of plug 358 within open end 362 of bottle 360.

In some embodiments, receptacle 300 may also include an adapter 370 for interconnecting cannulated plug 358 with a plurality of types of bottles. Adapter 370 has a cylindrical configuration and is fabricated from a resiliently pliable material. Adapter 370 is configured to be inserted within an open end of a bottle, for example, open end 362 of bottle 360, to frictionally engage open end 362 of bottle 360 and create a fluid-tight seal therewith. Adapter 370 defines a channel 372 therethrough configured for receipt of cannulated plug 358. To fluidly couple a bottle, for example, bottle 360 with spigot 350, adapter 370 is received within open end 362 of bottle 360 and cannulated plug 358 is received within channel 372 of adapter 370. It is contemplated that a plurality of adapters of various sizes and configurations may be provided to fluidly couple spigot 350 with a variety of fluid-containing bottles.

Receptacle 300 further includes a coupling member 380 disposed within cavity 310. Coupling member 380 is attached to an interior surface 307 of sidewall 306b of receptacle 300 and is configured to support and orient a bottle, for example, bottle 360, such that open end 362 of bottle 360 is disposed below a closed end 364 of bottle 360 to allow for gravity to drive fluid out of open end 362 of bottle 360 and into spigot 350. Coupling member 380 includes a first annular member 382 and a second annular member 384, smaller in diameter than first annular member 382. Annular members 382, 384 are spaced from one another along sidewall 306b. Second annular member 384 is disposed below first annular member 382 and closer to spigot 350. In some embodiments, coupling member 380 may be in the form of a hook and loop fastener straps, buckles, tethers, sleeves, or the like. It is contemplated that spigot 350 may be used with any of receptacles 1, 100, 200, or 300 disclosed herein.

Figure 9:
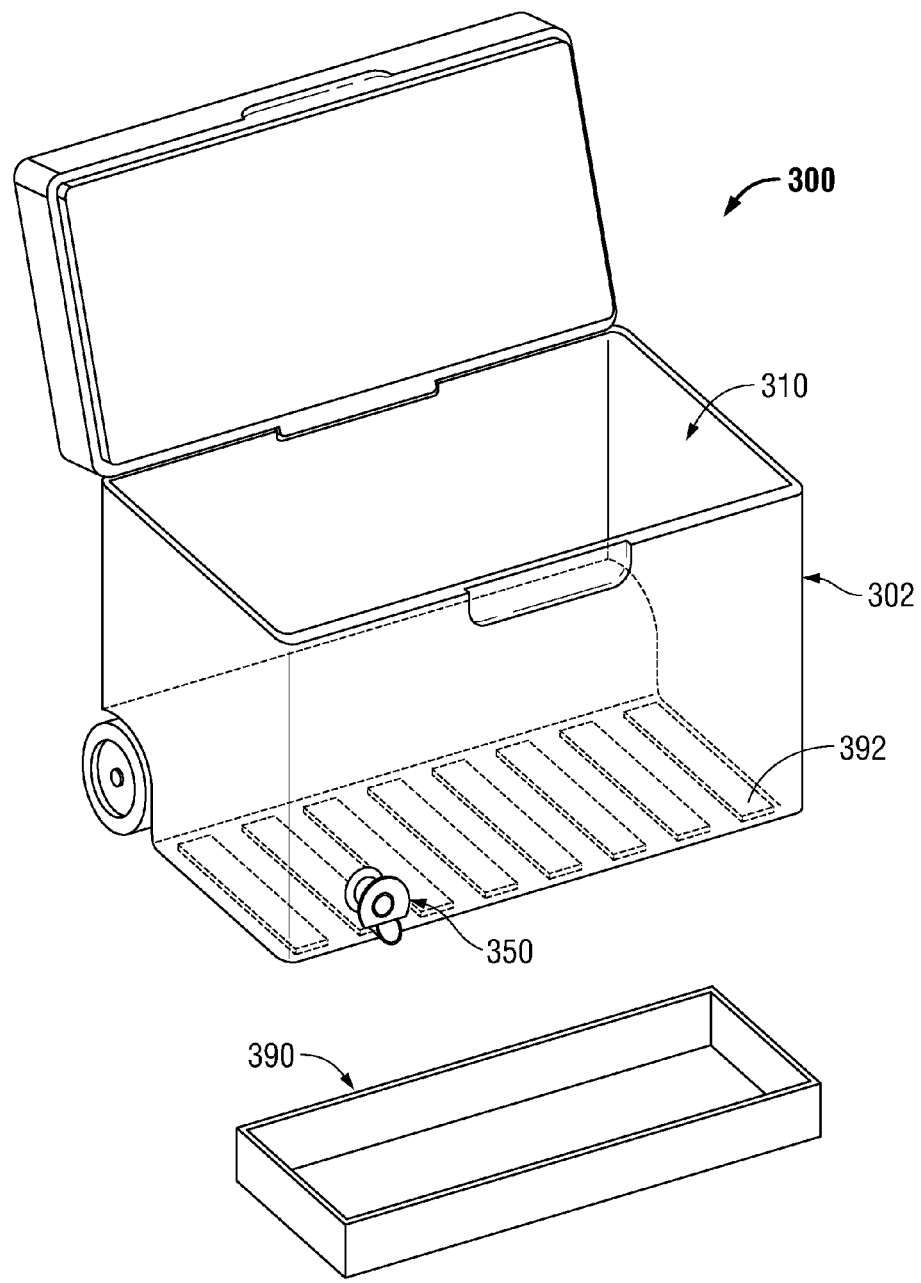
FIG. 9 is a perspective view of the thermally insulated receptacle of FIG. 7 including an insert.

With reference to FIG. 9, receptacle 300 further includes an insert 390 configured to hold ice therein. Insert 390 is configured for disposal in cavity 310 and to sit on raised sections 392 of body 302.

It will be understood that various modifications may be made to the embodiments disclosed herein. Therefore, the above description should not be construed as limiting, but merely as exemplifications of various embodiments. Those skilled in the art will envision other modifications within the scope and spirit of the claims appended thereto.

What is claimed is:
1. A thermally insulated receptacle, comprising:
a body defining a cavity, the body including:
a first longitudinal wall defining a length;
a second longitudinal wall defining a length;
a first sidewall defining a width; and
a second sidewall defining a width;
a cover operatively coupled to the body and movable relative to the body to selectively cover the cavity;
at least one loudspeaker pivotably coupled to the body, and
at least one elongate wheel,
wherein the lengths of both the first longitudinal wall and second longitudinal wall are greater than the widths of both the first sidewall and the second sidewall, and
wherein the at least one elongate wheel is rotatably connected to the body along one of the first longitudinal wall and the second longitudinal wall.
2. The thermally insulated receptacle according to claim 1, wherein the at least one loudspeaker has a first end pivotably coupled to the body and a second end, the at least one loudspeaker being pivotable between a first position, in which the first and second ends of the at least one loudspeaker are in abutment with the body, and a second position, in which the second end of the at least one loudspeaker is spaced from the body.

3. The thermally insulated receptacle according to claim 1, wherein the
second sidewall is in opposed relation to the first sidewall, the at least one loudspeaker including:
a first loudspeaker pivotably coupled to the first sidewall; and
a second loudspeaker pivotably coupled to the second sidewall.

4. The thermally insulated receptacle according to claim 3, wherein the first and second loudspeakers are pivotable to a fully extended position, in which the first and second loudspeakers are perpendicular to the respective first and second sidewalls of the body.

5. The thermally insulated receptacle according to claim 1, wherein at least one of the first sidewall and the second sidewall or both defines a depression in a surface thereof, the at least one loudspeaker being disposable in the depression.

6. The thermally insulated receptacle according to claim 1, wherein at least one of the first sidewall and the second sidewall or both defines a void and includes a slide disposed within the void, the at least one loudspeaker being pivotably coupled to the slide, the slide being movable within the void between a first position, in which the at least one loudspeaker is disposed within the void of the at least one of the first sidewall and the second sidewall or both, and a second position, in which the at least one loudspeaker projects from the at least one of the first sidewall and the second sidewall or both.

7. The thermally insulated receptacle according to claim 1, wherein the at least one elongate wheel extends from the first sidewall of the body to the second sidewall of the body.

8. The thermally insulated receptacle according to claim 1, wherein the body is Bluetooth enabled.

9. The thermally insulated receptacle according to claim 1, further comprising a spigot attached to the body and having a first end disposed outside of the cavity and a second end disposed within the cavity and configured to be fluidly coupled to a bottle.

10. The thermally insulated receptacle according to claim 9, wherein the second end of the spigot includes:
a tube; and
a cannulated plug attached to the tube and configured to frictionally engage an open end of a bottle.

11. The thermally insulated receptacle according to claim 10, further comprising a coupling member disposed within the cavity and configured to hold and orient a bottle such that an open end of the bottle is disposed below a closed end of the bottle.

* * * * *